(12) United States Patent
Moretti

(10) Patent No.: US 11,229,220 B2
(45) Date of Patent: Jan. 25, 2022

(54) USE OF A COMBINATION OF WHITE DEXTRINS AND HYDROXYPROPYL PHOSPHATE CROSSLINKED STARCHES AS A FAT SUBSTITUTE

(71) Applicant: ROQUETTE FRERES, Lestrem (FR)

(72) Inventor: Emmanuelle Moretti, Lille (FR)

(73) Assignee: ROQUETTE FRERES, Lestrem (FR)

( * ) Notice: Subject to any disclaimer, the term of this patent is extended or adjusted under 35 U.S.C. 154(b) by 7 days.

(21) Appl. No.: 16/461,632

(22) PCT Filed: Nov. 24, 2017

(86) PCT No.: PCT/FR2017/053255
§ 371 (c)(1),
(2) Date: May 16, 2019

(87) PCT Pub. No.: WO2018/096297
PCT Pub. Date: May 31, 2018

(65) Prior Publication Data
US 2019/0307142 A1    Oct. 10, 2019

(30) Foreign Application Priority Data
Nov. 24, 2016 (FR) .................................... 16 61469

(51) Int. Cl.
| | | |
|---|---|---|
| *A23C 9/154* | (2006.01) | |
| *A23L 29/30* | (2016.01) | |
| *A23L 29/219* | (2016.01) | |
| *A23C 9/137* | (2006.01) | |
| *A23G 9/34* | (2006.01) | |
| *A23C 19/09* | (2006.01) | |
| *A23C 15/16* | (2006.01) | |
| *A23D 7/015* | (2006.01) | |

(52) U.S. Cl.
CPC ............ *A23C 9/1544* (2013.01); *A23C 9/137* (2013.01); *A23C 9/154* (2013.01); *A23C 15/16* (2013.01); *A23C 19/0904* (2013.01); *A23D 7/015* (2013.01); *A23G 9/34* (2013.01); *A23L 29/219* (2016.08); *A23L 29/35* (2016.08); *A23V 2002/00* (2013.01)

(58) Field of Classification Search
CPC ....... A23C 9/1544; A23C 9/137; A23C 9/154; A23C 15/16; A23C 19/0904; A23L 29/35; A23L 29/219; A23D 7/015; A23G 9/34; A23V 2002/00
USPC .......................................................... 426/583
See application file for complete search history.

(56) References Cited

U.S. PATENT DOCUMENTS

| | | | |
|---|---|---|---|
| 3,369,910 A | 2/1968 | Ganz et al. | |
| 3,962,465 A | 6/1976 | Richter et al. | |
| 3,986,890 A | 10/1976 | Richter et al. | |
| 4,510,166 A * | 4/1985 | Lenchin ................... | A23G 9/32 426/565 |
| 4,536,408 A | 8/1985 | Morehouse et al. | |
| 4,981,709 A | 1/1991 | Furcsik et al. | |
| 5,110,612 A | 5/1992 | Quarles et al. | |
| 5,512,311 A | 4/1996 | Capitani et al. | |

FOREIGN PATENT DOCUMENTS

| | | | | |
|---|---|---|---|---|
| EP | 0672350 A2 | 9/1995 | | |
| EP | 0864255 A2 | 9/1998 | | |
| GB | 2323092 A | * | 9/1998 | ........... A23L 29/231 |

OTHER PUBLICATIONS

The English translation of the International Search Report, dated Jan. 17, 2018, in the corresponding PCT Appl. No. PCT/FR2017/053255.
Database GNPD [Online] MINTEL; Jul. 2004 (Jul. 2004), Procordia Food: "Latt Caesar Dressing med Parmesan Salad Dressing", XP002771617, Database accession No. 287500, the whole document.
Database GNPD [Online] MINTEL; Oct. 2007 (Oct. 2007), Nestle: "Vanilla Flavoured Rice Custard", XP002771618, Database accession No. 789654, the whole document.
Database GNPD [Online] MINTEL; May 2001 (May 2001), Yoplait: "Le Rice Dairy Snack", XP002771619, Database accession No. 96491, the whole document.
Database GNPD [Online] MINTEL; Sep. 2007 (Sep. 2007), Strauss Dairies: "4,5% Fat Chocolate Mousse", XP002771620, Database accession No. 776373, the whole document.
Database GNPD [Online] MINTEL; Jul. 2009 (Jul. 2009), Ruokakesko: "Lactose-Free Vegetable Fat Blend", XP002771621, Database accession No. 1131888, the whole document.
Database GNPD [Online] MINTEL; Oct. 2008 (Oct. 2008), Regal Cream Products: "Frozen Gourmet Yogurt", XP002771622, Database accession No. 991988, the whole document.

* cited by examiner

*Primary Examiner* — Brent T O'Hern

(57) ABSTRACT

The present invention concerns the use of a composition containing a hydroxypropyl phosphate crosslinked starch and a white dextrin for producing fresh milk products with a reduced fat content, characterised in that: —the hydroxypropyl phosphate crosslinked starch has a degree of substitution of between 0.09 and 0.2, preferably between 0.09 and 0.14, and more preferably between 0.10 and 0.11, and —the white dextrin has oa DE of less than 5, preferably less than 3, more preferably less than 2, oa viscosity at 40% dry matter of between 3600 and 6000 mPa·s, and oa solubles content of less than 30%.

14 Claims, No Drawings

USE OF A COMBINATION OF WHITE DEXTRINS AND HYDROXYPROPYL PHOSPHATE CROSSLINKED STARCHES AS A FAT SUBSTITUTE

CROSS-REFERENCE TO RELATED APPLICATIONS

This application is a National Stage Application of PCT/FR2017/053255 filed Nov. 24, 2017, which claims priority from French Patent Application No. 16 61469, filed on Nov. 24, 2016. The priority of said PCT and French Patent Application are claimed. Each of the prior mentioned applications is hereby incorporated by reference herein in its entirety.

TECHNICAL FIELD OF THE INVENTION

The present invention relates to the use of a combination of dextrins and starch derivatives as a fat substitute in various food products.

More particularly, this combination of ingredients can be advantageously used as a fat substitute in fresh milk products (dessert cream, fermented products, milk and vegetable drinks, butter, margarine, ice creams, cheese sauce, etc.), more particularly in dessert creams.

CONTEXT OF THE INVENTION

For a long time, starches have been used in the food industry, not only as a nutritive ingredient, but also as a thickener, binder, stabilizer or gelling agent.

Over the past few years, food product manufacturers have worked to develop techniques for reducing the lipid and calorie content of transformed foods.

The origin of the choice of these techniques is the increasing consumer awareness of the nutritive value and of the calorie content of foods, and the increased desire of said consumers to reduce the overall fat content of their diet, and also to reduce or maintain their body weight through the selection of foods with a low fat content.

Given that starch has a calorie content of only 4 kcal/g, whereas lipids have a calorie content of about 9 kcal/g, research efforts have been directed toward the modification of the functional and organoleptic properties of starch such that modified starch can be used as an effective dietary lipid substitute.

Two strategies for modifying starch have thus been implemented in the prior art:
- the acid or enzymatic conversion of starch into low-dextrose equivalent (DE) dextrins,
- the chemical modification of starch, resulting in stabilized forms by reaction of the hydroxyl groups of the starch with monofunctional agents in order to introduce substitution groups. These are starches such as starch acetate, monophosphates and hydroxypropyl ethers.

In the field of starch derivatives obtained by acid or enzymatic conversion of starch that are used as fat substitute, reference may be made to the following patents:
- U.S. Pat. No. 4,510,166 which describes starches converted for use as fat replacement. These starches are converted into a DE of less than 5 and have a certain hot flow viscosity, and also a minimum gel resistance when they are dispersed in water at 10% to 50% solids;
- U.S. Pat. No. 3,962,465 which describes processes for the treatment of starch with enzymes so as to convert the starch and to prepare a starch hydrolysate for use in foods. The hydrolysate has a DE of from 5 to 10 and forms a gel when it is dispersed in water, cooked and cooled;
- U.S. Pat. No. 3,986,890 which describes dextrins that can be successfully used as fat substitutes in deep-frozen products such as ice cream or products which require melting such as margarine. When they are used as a partial replacement (up to approximately 50%), the gels confer, on food products such as ice creams, margarine, glazings and sauces, organoleptic properties comparable to those of fat. In certain food products, they can be successfully used as total replacement.
- U.S. Pat. No. 4,536,408, which describes a low-fat spread prepared with a non-gelling starch hydrolysate which has a DE of between 4 and 25. The non-gelling starch hydrolysate can be used at a content of from 15% to 35% by weight of the preparation for reducing the fat by 50% in the spread.

In the field of starch derivatives obtained chemical modification of starch that are used as fat substitute, reference may be made to the following patents:
- U.S. Pat. No. 5,110,612 which describes bulking agents suitable for replacing sucrose in foods. These bulking agents comprise hydrolysates of starch hydroxypropyl ether derivatives, characterized in that at least 15% of the hydrolysate consists of a starch polymer having a degree of polymerization (DP) of 2 to 6. The hydrolysate has a DE of approximately 20 to 45;
- U.S. Pat. No. 3,369,910 which describes starch hydroxypropyl ether derivatives which are used for their stable thickening properties in foods subjected to freezing/thawing cycles and other types of temperature cycles (for example, cooking and cooling). These starch derivatives preferably have a degree of substitution (or DS, i.e. average number of substituted hydroxyl groups per unit of anhydroglucose) of approximately 0.15 to 0.21;
- U.S. Pat. No. 4,981,709 which discloses foods with a low or reduced fat content, prepared with derivatives of hydroxypropyl ethers of starch which is rich in amylose (starch having at least 40% amylose), which are non-crosslinked and which have a degree of substitution of at least 0.04.

Despite these numerous contributions made to date in the field of foods with a low or reduce fat content, food manufacturers persist in their demands for modified starches having organoleptic characteristics equivalent to the controls with fat.

The applicant company has thus found that this recurrent need can be met by a particular combination of certain dextrins with chemically modified starches.

SUMMARY OF THE INVENTION

The present invention relates to the use of a composition containing a crosslinked hydroxypropyl starch phosphate and a white dextrin for the production of fresh milk products with a reduced fat content, characterized in that:
- the crosslinked hydroxypropyl starch phosphate has a degree of substitution of between 0.09 and 0.2, preferably of between 0.09 and 0.14, even more preferentially approximately 0.10 to 0.11,
- the white dextrin has:
  - a DE of less than 5, preferably less than 3, more preferentially less than 2, a viscosity at 40% solids of between 3600 and 6000 mPa·s, and a solubles content of less than 30%.

The present invention also relates to a method for preparing a fresh milk product with a reduced fat content, characterized in that a crosslinked hydroxypropyl starch phosphate and a white dextrin are added to the components of said fresh milk product and in that:

the crosslinked hydroxypropyl starch phosphate has a degree of substitution of between 0.09 and 0.2, preferably of between 0.09 and 0.14, even more preferentially approximately 0.10 to 0.11;

the white dextrin has:
a DE of less than 5, preferably less than 3, more preferentially less than 2,
a viscosity at 40% solids of between 3600 and 6000 mPa·s, and
a solubles content of less than 30%.

Preferably, the reduced fat content is a reduction of 5% to 50% by weight, preferably of about 50% by weight of the total fat content of said fresh milk products.

More particularly, the origin of the starch used to prepare the crosslinked hydroxypropyl starch phosphate and the white dextrin is chosen from corn, potato, sweet potato, wheat, rice, sago, tapioca, corn, rice, pea, quinoa and sorghum, and is more particularly:

waxy corn, for the preparation of the crosslinked hydroxypropyl starch phosphate, pea, for the preparation of the white dextrin.

Moreover, the crosslinked hydroxypropyl starch phosphate is incorporated into the milk product in a content of between 0.4% and 5%, preferably between 1.5% and 5% by weight, even more preferentially of about approximately 3.7% by weight, the white dextrin is incorporated into the milk product in a content of between 0.1% and 2% by weight, preferably between 0.3% and 0.5% by weight, even more preferentially of about approximately 0.4% by weight.

More particularly, this combination of ingredients can be advantageously used as a fat substitute in fresh milk products chosen from dessert creams, fermented products, milk and vegetable drinks, butter, margarine, ice creams, and cheese sauces, and more particularly dessert creams.

This composition comprising crosslinked hydroxypropyl starch phosphate and white dextrin will thus be used in milk product preparations in which the fat content has been reduced by 5% to 50% by weight, preferably about 50% by weight.

DETAILED DESCRIPTION OF THE INVENTION

Definition of the Technical Field

By virtue of their multiple physicochemical properties, starch and starch derivatives have a broad range of food applications, in which, in addition to their nutritive values specific to carbohydrates, starches exert a great influence on viscosity and texture.

Nowadays, consumers want to consume products of high nutritional quality (low sugar, low fat, etc.) while at the same time keeping the same sensory properties.

On the milk-based dessert market, it has been shown that the texture affects food preferences and that creaminess is a key element guiding consumer tastes and choices.

Starch is the principal storage polysaccharide of higher plants, and is biosynthesized in the form of grains, the size, the shape and the amylose/amylopectin ratio of which depend on its botanical origin (potato, maize, wheat, pea, etc.). It represents a considerable weight fraction in numerous agricultural raw materials such as cereals (30% to 70%), tuberous plants (6% to 90%) and leguminous plants (25% to 50%).

Native starches correspond to the raw product, extracted without molecular structure modification. These are inexpensive, renewable, abundant nutrients which, after cooking, have many functions in foods, such as thickening, gelling, binding or else sweetening functions, but their use in the food industry remains limited.

This is because native starch has many drawbacks, such as the formation of an opaque gel, a poor resistance to high-heat treatments, to shear forces and to acidity and a poor texture stability over time due to retrogradation (formation of semi-crystalline structures from amylose during cooling).

The use of native starches is reserved for products which are subjected to cooking and to moderate technical treatments and which are consumed rapidly after they have been prepared. The most widely used native starches are potato flour and corn starch.

In order to overcome the abovementioned drawbacks, starches can be subjected to physical and/or chemical modifications and thus be adjusted to the needs of food producers via consumer demands.

Corn starch is used in dessert creams, and said starch needs to be crosslinked and stabilized for an optimal result.

Crosslinking corresponds to the introduction of intermolecular and intramolecular bonds enabling better resistance to high temperatures, to acidity and to shear forces.

On the other hand, the more crosslinked a starch is, the more its swelling capacity and therefore its viscosity decreases. The crosslinking is carried out by adding crosslinking agents such as phosphate or adipate.

Stabilization is, for its part, a chemical modification which results in the grafting of acetate or hydroxypropyl groups onto the starch molecules. It makes it possible to prevent re-associations of these molecules after cooking and thus to minimize retrogradation-associated phenomena, that is to say the increase in viscosity upon cooling as far as gelling or else syneresis.

Furthermore, the gelling temperature, which is the temperature at which the maximum viscosity is reached, is reduced.

Dessert cream is a product widely consumed in Europe, known as "Natillas" in Spain, "Via" in the Netherlands or else "Custards" in England. Dessert creams are acclaimed by consumers for their sensory properties, but also for their nutritive qualities.

In research, this model is commonly taken as a semi-solid matrix model for its simple structure and its low number of ingredients.

A dessert cream can be defined as a suspension of deformable particles (swollen starch granules) dispersed in a homogeneous medium containing milk proteins and also hydrocolloids such as carrageenans and guar and xanthan gums.

In practice, the standard recipe for a dessert cream is composed:

of milk (>80% by weight),
of sugar (8-12% by weight),
of modified starch (2-4% by weight), of carrageenan, guar gum or xanthan gum (0.01-1% by weight),
of flavoring and, if required,
of dyes.

The production process follows four major steps:
the mixture of powders (modified starch, sugar, carrageenans)/milk is heated to 55° C., then
homogenized at between 0 and 200 bar, preferably 50 bar, before being sterilized at 135° C. for 55 seconds (or by UHT treatment);
packaging between 10 and 20° C. (sometimes <10° C.) and storage at 4° C.

In rheology, a dessert cream is a shear-thinning fluid for which the apparent viscosity $\eta_a$ decreases when the shear rate $\gamma$ increases.

Its flow curve is described by the Oswald-de Waele relationship:

$$\eta_a = k\dot\gamma^{n-1}$$

where "n" is the flow index (n<1) and "k" is the consistency index.

The viscoelastic behavior of a dessert cream is established by harmonic-regime measurements of which the elastic modulus G' and viscous modulus G" are deduced (viscoelastic solid when G'>G" and viscoelastic fluid when G"<G').

Thus, the flow threshold is determined when G'=G".

The rheological and sensory properties of dessert creams are influenced by the particular characteristics of the various ingredients, such as the fat content of the milk, the type and concentration of the carrageenans and of the starches and the interactions which ensue therefrom.

Dessert creams are made up of more than 80% milk, which is the main ingredient thereof.

The difference between a whole milk and a skimmed milk relates to the viscosity: dessert creams containing whole milk are more viscous and perceived to be thicker, more fatty and more creamy from a sensory point of view.

As regards hydrocolloids, it is common practice to use kappa-, iota- or lambda-carrageenans, or guar or xanthan gums, as texturing agents. Indeed, in the presence of milk, carrageenans are absorbed by the casein micelles which increase in size and thus form a gelled network.

The increase in carrageenan content causes the viscosity and the viscous and elastic moduli to increase in terms of rheology and also the thickness and the creaminess to increase in terms of sensory analysis.

Matrices containing lambda-carrageenans are perceived to be sweeter, more creamy and more smooth than those with kappa-carrageenans.

As for the use of modified starches, it is increasingly more common due to their higher heat resistance and their greater stability over time compared with native starches, while at the same time providing the milk products with greater texture and less syneresis.

The choice of starch is of essential importance in the dessert cream production process.

This is because, depending on their modification, starches do not offer the same textural properties: with the same crosslinking agent, the more a starch is crosslinked, the less it will increase in viscosity and the higher its concentration will have to be in the formulation in order to obtain an equivalent texture.

Furthermore, a phosphate/hydroxypropyl modified starch will confer greater viscosity on a dessert cream than an adipate/acetate modified starch and this cream will be perceived to be more creamy, smooth and fatty.

Finally, a large number of authors have focused on HP inulin (average degree of polymerization ≥25) as fat-mimicking ingredient.

They have demonstrated that the use of inulin in fat-poor matrices gives results similar to fat-rich controls both in terms of rheology and in terms of sensory analysis.

However, above a certain concentration (6%), the viscosity decreases, which is due to inulin/starch competition for the water, the starch not having enough water to swell.

Choice of Ingredients

In order to find a substitute for fat in dessert creams taken as a matrix model, the applicant company has tested several ingredients (taken alone or in combination).

It thus identified that the combination of a crosslinked hydroxypropyl starch phosphate and a low-DE white dextrin gives much better results in a fresh milk product having a fat content reduced by 50% by weight.

According to the invention, the origin of the starch used to prepare the crosslinked hydroxypropyl starch phosphate and the white dextrin can be derived from any source, including corn, potato, sweet potato, wheat, rice, sago, tapioca, corn, rice, pea, quinoa and sorghum.

The crosslinked hydroxypropyl starch phosphate can be prepared from any one of the basic starches above, and more particularly from waxy corn starch (waxy starch), by any means known moreover to those skilled in the art.

The crosslinked hydroxypropyl starch phosphate crosslinked starch is also known as hydroxypropyl distarch phosphate. It is a starch crosslinked with sodium trimeta phosphate or with phosphorus oxychloride and etherified with propylene oxide. It is defined as E1442 and registered with the FDA (CFR title 21) under number 172.892. The CAS number corresponding to this product is 53124-00-8.

The suitable crosslinked hydroxypropyl starch phosphate must have a degree of substitution (DS) of between 0.09 and 0.2, preferably of between 0.09 and 0.14, even more preferentially of approximately 0.10 to 0.11 so that it is stable, that is to say does not gel in the aqueous dispersion The term "DS" or "degree of substitution" is intended to mean the average number of substituted hydroxyl groups per anhydroglucose unit.

The term "approximately" is intended to mean plus or minus 10% of the value, preferably plus or minus 5% thereof. For example, "approximately 100" means between 90-110, preferably between 95-105.

For example, a crosslinked hydroxypropyl starch phosphate sold by the applicant company under the brand Clearam® CR3010 is perfectly suitable for use in the present invention.

The crosslinked hydroxypropyl starch phosphate is incorporated into the food preparation in a content of between 0.4% and 5%, preferably between 1.5% and 5% by weight or between 3% and 5% by weight, even more preferentially of about 3.7% by weight.

The low-DE white dextrin is a low-DE dextrin, having:
a DE (Dextrose Equivalent) of less than 5, preferably less than 3, more preferentially less than 2,
a viscosity at 40% solids of between 3600 and 6000 mPa·s, and
a solubles content of less than 30%.

The white dextrin is more particularly prepared from pea starch, by any means known moreover to those skilled in the art.

The white dextrin corresponds to CAS No 9004-53-9.

The viscosity of the white dextrin is in particular measured at 30° C. More specifically, it can be measured by the method described below. The solubles content is in particular measured by the method described below. For example, a low-DE white dextrin sold by the applicant company under the brand Tackidex®B 735 is perfectly suitable for use in the present invention.

The white dextrin is incorporated into the food preparation in a content of between 0.1% and 2% by weight, preferably between 0.3% and 0.5% by weight, even more preferentially of about approximately 0.4% by weight.

In order to determine the capacity of the combination according to the invention to replace the fat of dessert creams, a certain number of analyses were carried out by the applicant company.

Measurement of the Viscosity of the White Dextrins, in Particular Pea White Dextrins The viscosity is measured using a viscosity analyzer (Rapid Viscosimeter Analyzer of Physica MCR 501 type or equivalent) under given concentration conditions and according to a suitable temperature/time analysis profile.

Analysis Profile:

| Time hh:mm:ss | Temperature ° C. | Rotational speed Rpm |
|---|---|---|
| 00:00:00 | 90 | 160 |
| 00:02:00 | 90 | 600 |
| 00:03:00 | 90 | 160 |
| 00:03:30 | 90 | 160 |
| 00:06:30 | 30 | 160 |
| 00:12:00 | 30 | 160 |

End of test: 00:12:10 (hh:mm:ss)

Initial temperature: 90° C.±3° C.

Data acquisition interval: 4 seconds

Sensitivity: low

Test sample: concentration of 40%, i.e. 11.20 g of anhydrous weight.

Procedure:

introduce 11.20 g at ±10 mg into the bowl of the viscometer, introduce demineralized water until a total weight equal to 28.00±0.01 g is obtained, carefully homogenize the whole mixture with a microspatula and wipe the microspatula thoroughly on the end of the stirrer blade, place the stirrer played in the bowl of the viscometer, introduce the system into the heating chamber of the instrument, the analysis is automatically recorded.

The variations in viscosity are measured by microprocessor in RVU. The measurement retained is that at 12 minutes (expressed in mPa·s, in the knowledge that 1 RVU=12 mPa·s).

Measurement of the Solubles Content of the White Dextrins, in Particular Pea White Dextrins The solubilization of a dextrinized starch is an indication of its modification. The solubilization is carried out by dissolving a known amount of dextrin sample in 200 ml of distilled water, and filtering, and the solubles are determined on the filtrate.

Procedure:

introduce 5.0 g of the sample to be analyzed into a 300 ml flask and disperse with 200 ml of distilled water. Stopper the flask, place in a thermostated water bath regulated at 22° C.±1° C. placed on a magnetic stirrer, stir for 5 minutes and leave for 4 hours while stirring for 5 minutes every 30 minutes, remove the flask, filter on a pleated Whatman 2V filter (porosity 8 μm) and pipette 50 ml of filtrate into a pre-dried and pre-tared crystallizing dish, evaporate off most of the water in an oven (infrared, aerated, allowing drying at 50-60° C.) then 1 h 30 in an oven (regulated at 130° C.±3° C.), cool in a desiccator and re-weigh.

The solubles content, expressed as a weight percentage of product per se, is given by the formula:

$$\frac{(P - P') \times 200 \times 100}{50 \times w}$$

in which:

P' is the weight, in grams, of the empty crystallizing dish

P is the weight, in grams, of the crystallizing dish after it has been in the oven w is the weight, in grams, of the test sample.

Thus, the combination of crosslinked hydroxypropyl starch phosphate and white dextrin according to the present invention makes it possible to decrease the fat contents of fresh milk products.

The milk product may be a dessert cream conventionally containing:

milk, preferably skimmed milk, in particular in a proportion of at least 80% by weight;

sugar, preferably in a proportion of 8-12% by weight;

cream, preferably containing 35% fat, in particular in a proportion of 0 to 10% by weight, preferably between 3% and 8%;

carrageenans, guar gum or xanthan gum, in particular in a proportion of 0.01% to 1% by weight;

a flavoring, for example vanilla or chocolate flavoring; and optionally a dye.

The present invention relates to the use of a combination of crosslinked hydroxypropyl starch phosphate and white dextrin according to the present invention or of a composition comprising crosslinked hydroxypropyl starch phosphate and white dextrin according to the present invention, for reducing the fat contents of fresh milk products or for preparing fresh milk products having reduced fat contents.

The expression "reduced or decreased fat contents" is intended to mean that the fresh milk product has a reduction of 5% to 50% by weight of the total fat content, preferably from 10% to 50%, for example from 10% to 20%, 20% to 30%, 30% to 40% or 40% to 50%, relative to the reference fresh milk product. For example, in the context of the dessert cream, the dessert cream which has reduced fat contents comprises less than 3% by weight of fat, preferably less than 2%, and for example approximately 1.5%.

The present invention relates to a method for preparing a fresh milk product with a reduced fat content, characterized in that a crosslinked hydroxypropyl starch phosphate and a white dextrin according to the present invention are added to the components of said fresh milk product.

Preferably, the components of said fresh milk product comprise milk, preferably skimmed milk, in particular in a proportion of at least 80% by weight. They may also comprise sugar, preferably in a proportion of 8-12% by weight;

cream, preferably containing 35% fat, in particular in a proportion of 0 to 10% by weight, preferably between 3% and 8%;

carrageenans, guar gum or xanthan gum, in particular in a proportion of 0.01% to 1% by weight;

a flavoring, for example vanilla or chocolate flavoring; and optionally a dye.

The method comprises, for example, mixing of the components of said fresh milk product with the crosslinked hydroxypropyl starch phosphate and the white dextrin according to the present invention, homogenization, sterilization and packaging.

The present invention also relates to a fresh milk product with a reduced fat content, comprising crosslinked hydroxypropyl starch phosphate and white dextrin according to the present invention, wherein the crosslinked hydroxypropyl starch phosphate is present in the milk product in a content of between 0.4% and 5% by weight, preferably between 1.5% and 5% by weight, even more preferentially of about approximately 3.7% by weight, the white dextrin is present in the milk product in a content of between 0.1% and 2% by weight, preferably between 0.3% and 0.5% by weight, even more preferentially of about approximately 0.4% by weight.

Preferably, the fresh milk product comprises less than 3% by weight of fat, preferably less than 2%, and for example approximately 1.5%.

The invention will be understood more clearly with the aid of the following examples which are intended to be illustrative and nonlimiting.

EXAMPLES

Example 1: Vanilla Dessert Creams

A first vanilla dessert cream recipe according to the invention was prepared, wherein 50% of the fat was replaced with a combination:
  of a pea dextrin (sold by the applicant company under the brand name Tackidex® B 735) with
  a crosslinked hydroxypropyl starch phosphate derivative (HP starch) (sold by the applicant company under the brand name Clearam® CR3010).

As a comparison, four other recipes were developed,

Recipe No. 1: recipe wherein the fat substitution is carried out by the combination:
  of pea dextrin with
  another category of chemically modified starch: an acetylated modified starch (conventionally used as texturing agent) sold by the applicant company under the brand name Clearam® CH3010;

Recipe No. 2: recipe wherein the fat substitution is carried out by the combination:
  of an agent conventionally used in milk products as a fat substitute: HP inulin (Raftiline H P, Beneo-Orafti, Oreye, Belgium) (in place of the dextrins), with
  a crosslinked hydroxypropyl starch phosphate derivative (sold by the applicant company under the brand name Clearam® CR3010);

Recipe No. 3: recipe wherein the fat substitution is carried out by the combination:
  of an agent conventionally used in milk products as a fat substitute: inulin, with
  the acetylated modified starch sold by the applicant company under the brand name Clearam® CH3010;

Recipe No. 4: a recipe rich in fat, containing Cleararm® CR3010 alone (without pea dextrin);

Recipe No. 5: a recipe rich in fat, containing Cleararm® CH3010 alone (without pea dextrin).

| % Recipe | Tests with reduced fat content (1.5% fat) | | | | Controls rich in fat | |
| --- | --- | --- | --- | --- | --- | --- |
| | according to the invention Pea dextrin + HP starch | 1 Pea dextrin + Acetylated starch | 2 Inulin + HP starch | 3 Inulin + Acetylated starch | 4 3% Fat with HP starch | 5 % Fat with acetylated starch |
| skimmed milk (10% solids) | 81.87 | 81.87 | 81.87 | 81.87 | 78.07 | 78.07 |
| Sugar | 9.00 | 9.00 | 9.00 | 9.00 | 9.00 | 9.00 |
| 35% cream (Les Fayes) | 4.00 | 4.00 | 4.00 | 4.00 | 8.20 | 8.20 |
| HP starch Clearam CR3010 | 3.70 | / | 3.70 | / | 3.70 | / |
| Acetylated starch Clearam CH3010 | / | 3.70 | / | 3.70 | / | 3.70 |
| Carrageenans (AGI Matgel SP830) | 0.08 | 0.08 | 0.08 | 0.08 | 0.08 | 0.08 |
| Tackidex ® B735 | 0.40 | 0.40 | / | / | / | / |
| HP Inulin | / | / | 0.40 | 0.40 | / | / |
| Vanilla flavoring | 0.60 | 0.60 | 0.60 | 0.60 | 0.60 | 0.60 |

-continued

| % Recipe | Tests with reduced fat content (1.5% fat) | | | | Controls rich in fat | |
|---|---|---|---|---|---|---|
| | according to the invention Pea dextrin + HP starch | 1 Pea dextrin + Acetylated starch | 2 Inulin + HP starch | 3 Inulin + Acetylated starch | 4 3% Fat with HP starch | 5 % Fat with acetylated starch |
| Dye | 0.10 | 0.10 | 0.10 | 0.10 | 0.10 | 0.10 |
| Dipotassium phosphate | 0.20 | 0.20 | 0.20 | 0.20 | 0.20 | 0.20 |
| Salt | 0.05 | 0.05 | 0.05 | 0.05 | 0.05 | 0.05 |
| Total | 100 | 100 | 100 | 100 | 100 | 100 |

The protocol for preparing the recipes is as follows:
Heat the milk to 50° C.,
Add the powders and leave to hydrate for 1 h at 50° C.,
Add the rest of the powders using a stirrer/mixer (of Turbotest type from Rayneri) and leave to stir for 5 minutes,
Add the cream using a Polytron homogenizer of PT 45 type,
Leave to stir for 5 minutes,
Add the dye,
Add the dipotassium phosphate (pH adjustment),
Verify the pH (pH 7),
Heat to 55° C. using a water bath,
Homogenize at 50 bar 1 stage with a homogenizer (Niro Panda),
Carry out the heat treatment for 55 s at 135° C.,
Package and store at 4° C.
Sensory Analyses
The results obtained are given in the table below:

| | Tests with reduced fat content (1.5%) | | | | Controls rich in fat | |
|---|---|---|---|---|---|---|
| | according to the invention | 1 | 2 | 3 | 4 | 5 |
| Short texture | | + | | + | | + |
| Coating in the mouth | | − | | − | | − |
| Coating with a spoon | + | − | | − | + | − |
| Glossy | | | + | | | |
| Thick | + | − | | + | | |
| Tacky | + | | | + | | |
| Creamy | + | | | + | | |
| Fatty | + | | | + | | |

These results indicate that these recipes can be categorized in 3 families:
Family 1 which groups together the recipe according to the invention and the control recipe 4; the Recipe according to the invention (fat reduced by 50% and combining the Tackidex B 735 pea dextrin+HP Starch CR3010) in fact has the same behavior as the control Recipe 4 (100% fat+HP Starch alone);
Family 2 which groups together recipes 1, 3 and 5; the Recipe 1 combining pea dextrin+acetylated Starch has the same behavior as the Recipe 3 Inulin+acetylated Starch and the control Recipe 5 (100% fat+acetylated Starch alone);
Family 3 which includes only Recipe 2 (Inulin+HP starch).

In conclusion, the recipe according to the invention containing 1.5% fat confers a sensory effect that is as fatty as the control recipe containing 3% fat, with a coating aspect with a spoon, and also has a more fatty effect than the more conventional recipe which combines inulin with HP starch.

An additional study was carried out by comparing the sensory profile with the fluidity/viscosity, texture and particle size measurements.

Particle Size Analyses

The particle size distribution of the dessert creams shows that the size of the granules differs according to the starch: the size of the acetylated/adipate starches is about 55 μm, while that of the hydroxypropyl starches is 45 μm.

In comparison with the sensory results, it is noted that the smaller the starch granules, the more creamy the cream is perceived to be.

Rheological Analyses

When the HP inulin is used, the viscosity of the creams is equivalent to that of the creams containing 1.5% fat.

In point of fact, it is noted that the viscosity of the creams with pea dextrin (Tackidex@) is equivalent to that of a control cream containing 3% fat.

In comparison with the sensory results, the creaminess correlates with the hysteresis loop (r=0.85); the destructuring capacity of a product thus influences the creaminess.

| measurements at 20° C. | hysteresis in Pa · s | |
|---|---|---|
| D + 3 | Recipe 4 | Recipe 5 |
| 3.7% of starch containing 3% fat | 4610 | 370 |

The hysteresis areas are higher with the hydroxypropyl starches than with the acetylated starches.

| measurements at 20° C. | hysteresis Pa · S |
|---|---|
| Recipe according to the invention | 3590 |
| Recipe 2 | 3560 |
| Control recipe 5 | 4610 |

A dessert cream containing 3.7% of hydroxypropyl starch (Clearam® CR3010) and 1.5% fat can replace a dessert cream containing 3.7% of acetylated starch (Clearam® CH3010) and 3% fat in order to keep the same orders of magnitude of hysteresis area.

Furthermore, these values show that the pea-based dextrin (Tackidex® B 735) is equivalent to HP inulin, as regards hysteresis.

However, the test with inulin emerges as less creamy and fatty in terms of sensory analysis than that incorporating said pea dextrin.

Example 2: Chocolate Dessert Creams

Two recipes are developed, according to the table below:

| % | Control Recipe | Recipe according to the invention |
|---|---|---|
| skimmed milk (10% solids) | 76.44 | 76.44 |
| Sugar | 10.00 | 10.00 |
| 35% cream (Les Fayes) | 7.23 | 2.23 |
| Promil® 852 A (concentrated milk proteins) | 0.47 | 0.59 |
| Clearam® CR 3010 | 1.80 | 1.80 |
| Tackidex® B735 | 0 | 0.40 |
| Cocoa powder (10% fat) | 2.00 | 2.00 |
| Milk chocolate (Barry Callebaut) | 2.00 | 2.00 |
| Carrageenans (AGI Matgel SP830) | 0.06 | 0.06 |
| Water | | 4.48 |
| Total | 100 | 100 |
| Solids | 26.23 | 24.69 |

Ingredients:

| | Control Recipe | Recipe according to the invention |
|---|---|---|
| Proteins | 3.72 | 3.72 |
| Carbohydrates | 17.35 | 17.52 |
| Fat | 3.50 | 1.75 |
| Fibers | 0.63 | 0.66 |
| Fat substitution | | 50% |

The process for manufacturing the chocolate creams is as follows:
Heat the skimmed milk in a water bath at 50° C.,
Mix, into a Mix A, the sugar, the starch, the cocoa powder and the carrageenans,
Mix, into a Mix B, the milk chocolate and the cream; heat to 50° C.; add thereto the concentrated milk proteins with stirring in a mixer (equipped with a rotor-stator spindle of the Silverson® brand at 4700 rpm,
Introduce the Mix A into the skimmed milk, hydrate for 30 minutes at 50° C. with stirring in a mixer (Silverson) at 4700 rpm,
Add the Mix B to the Mix A (emulsify at 10,000 rpm for 5 minutes).
In the tubular exchanger at 20 l/h:
Homogenize at 100 bar/$1^{st}$ stage at 63° C.,
Sterilize at 133° C. for 55 seconds,
Cool to 15° C.,
Store at +4° C.

Rheological analyses were carried out on a Physica MCR301 rheometer (Anton Paar) under the following conditions:
Spindle: CC27
Equilibrium time: 300 seconds
Applied stress: 0-350 $s^{-1}$ 180 s and return 350-0 $s^{-1}$ 180 s;
Temperature: 13° C.

| Measurement carried out at D + 1 | | | | |
|---|---|---|---|---|
| | Viscosity (Pa · s) | | | Hysteresis |
| | $5\ s^{-1}$ | $40\ s^{-1}$ | $350\ s^{-1}$ | area |
| Control Recipe | 6 | 1.18 | 0.22 | 4330 |
| Recipe according to the invention | 4.8 | 1.03 | 0.22 | 2590 |

| Measurements carried out at D + 14 | | | | |
|---|---|---|---|---|
| | Viscosity (Pa · s) | | | Hysteresis |
| | $5\ s^{-1}$ | $40\ s^{-1}$ | $350\ s^{-1}$ | area |
| Control Recipe | 7.15 | 1.41 | 0.25 | 5010 |
| Recipe according to the invention | 5.5 | 1.1 | 0.21 | 3170 |

| Measurements carried out at D + 21 | | | | |
|---|---|---|---|---|
| | Viscosity (Pa · s) | | | Hysteresis |
| | $5\ s^{-1}$ | $40\ s^{-1}$ | $350\ s^{-1}$ | area |
| Control Recipe | 8.2 | 1.4 | 0.24 | 4890 |
| Recipe according to the invention | 5.8 | 1.1 | 0.2 | 3220 |

These tests show that the Recipe according to the invention is acceptable, even though less viscous than the Control recipe.

As for the perception of the fattiness and of the chocolate, it is the same for all the dessert creams. However, the perceived differences relate to the texture.

The dessert cream according to the invention is more coating with a spoon.

It was possible to verify the intra-session repeatability of the texture by twice submitting the cream with the recipe according to the invention, close to the first dimension which correlates with the descriptors of interest.

Other tests were carried out by increasing, for this application, the HP starch content to 2.3% instead of 1.8%, while maintaining the pea dextrin content at 0.4%.

The results obtained show that the recipe is more viscous than the control.

The perception of the chocolate, of a texture that is both creamy and granular, is also the same for all the dessert creams.

The control and the recipe according to the invention remain the samples that are the most textured, namely coating and thick in the mouth, with a short and thick spoon texture.

In conclusion, an intermediate concentration between 1.8% and 2.3% made it possible to easily achieve viscosities equivalent to the control.

Materials and Methods

Measurement of Particle Size

The measurement of the size of the starch granules makes it possible to have an idea of the state of cooking (swelling or bursting) of the starch grain. These particle size measurements were carried out on the Mastersizer 3000 particle size analyzer from Malvern in liquid according to the Mie theory, the dispersant being water.

Each measurement was repeated three times.

The characteristic volume diameters $Dv_{10}$, $Dv_{50}$ and $Dv_{90}$ and the volume mode are noted for each sample.

$Dv_{50}$ is the diameter for which 50% of the grains are smaller; it represents the median size of the grains.

$Dv_{10}$ and $Dv_{90}$ are defined in the same way and characterize the size of the respectively finest and coarsest fractions.

The mode corresponds, for its part, to the mean diameter of the most encountered population.

Rheology Measurements

The viscosity and hysteresis loop or thixotropy measurements were carried out on the AR2000 rheometer from TA Instruments:
  temperature of 20° C.,
  the measurement is carried out in flow mode: the shear rate increasing logarithmically from 0.01 to 200 $s^{-1}$.

This thixotropy measurement makes it possible to observe the loss of structure of a dessert cream or of a yogurt and its capacity or incapacity to restructure itself.

The texture measurements are carried out with the TAXT PLUS from Stable Micro Systems; the firmness (max force), the adhesion (area under the negative curve) and the length of the flow trickle are calculated, for their part, from the penetration measurements carried out with the texturometer with a cone geometry at 20° C.: the spindle descends into the dessert cream at 2 mm/s and the measurement is triggered as soon as the force reaches 1 g.

When the spindle comes back up, the length of the flow trickle is measured.

Measurement of the Texture of the Creams

The texture of the dessert creams, in particular the creaminess, is a complex sensory parameter which involves a methodology based on the investigation and quantification of suitable descriptors. The choice related to the quantitative descriptive analysis—or conventional profile—for characterizing the dessert creams.

Panel

The panel consisted of 18 individuals.

The panel is qualified for tasting formulated products. It received training so as to check its performance in terms of:
  Capacity to discriminate between the products
  Consensus, correct use of the descriptors
  Repeatability, ability to detect a product submitted twice.

Tasting Conditions

In a sensory analysis laboratory: individual tasting cubicles, white walls, calm environment (to facilitate concentration)

White light (to have exactly the same vision of the product)

At the end of the morning or the afternoon (to be at the height of the sensory capacities)

Products rendered anonymous with a three-figure code (to prevent the code from influencing the assessment of the products)

Products presented in a random order (to prevent order and persistence effects)

Exercise

The method employed to compare the products was the Flash Profile (J. M. Sieffermann, 2000).

The products are all presented simultaneously. It is a matter of comparing the products with one another by making a succession of classifications: the panelists choose the descriptors which appear to them to be the most pertinent to discriminate between the products, and classify the products according to these descriptors; it is possible that several products are grouped in the same row.

Example

Sensory descriptor: creamy

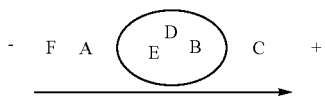

The list of descriptors presented to the panelists as a function of the creams prepared, detailing definition and procedure is exemplified below:

Data Processing

The statistical processing method suited to this type of data is multiple factor analysis (J. Pages, 1994) on the notes of the products. The set of descriptors generated by a judge is a group of variables. The graphs presented summarize all of the results provided by this method.

The statistical treatments were carried out with the software R version 2.14.1 (2011 Dec. 22) (execution script and data in the annex).

The invention claimed is:

1. A method for preparing a fresh milk product with a reduced fat content relative to a reference fresh milk product, said fresh milk product comprising components comprising:
  milk;
  sugar;
  cream;
  carrageenans, guar gum or xanthan gum;
  a flavoring; and
  optionally a dye,
  the method comprising the step of adding a crosslinked hydroxypropyl starch phosphate and a white dextrin to the components of said fresh milk product, wherein:
    the crosslinked hydroxypropyl starch phosphate has a degree of substitution of between 0.09 and 0.2; and
    the white dextrin has:
      a dextrose equivalent (DE) of less than 5,
      a viscosity at 40% solids of between 3600 and 6000 mPa·s, and
      a solubles content of less than 30%.

2. The method as claimed in claim 1, wherein the reduced fat content is a reduction in total fat content of 5% to 50% by weight relative to the reference fresh milk product, the reference fresh milk product being identical to the fresh milk product produced but for the addition of the crosslinked hydroxypropyl starch phosphate and the white dextrin.

3. The method as claimed in claim 1, wherein the crosslinked hydroxypropyl starch phosphate and the white dextrin originates from a starch chosen from corn, potato, sweet potato, wheat, rice, sago, tapioca, corn, rice, pea, quinoa, and sorghum.

4. The method as claimed in claim 1, wherein:
the crosslinked hydroxypropyl starch phosphate is incorporated into the fresh milk product in a content of between 0.4% and 5% by weight, and
the white dextrin is incorporated into the fresh milk product in a content of between 0.1% and 2% by weight.

5. The method as claimed in claim 1, wherein the fresh milk product is chosen from dessert creams, fermented products, milk drinks, butter, ice creams, and cheese sauces.

6. The method as claimed in claim 1, wherein the crosslinked hydroxypropyl starch phosphate has a degree of substitution of between 0.09 and 0.14.

7. The method as claimed in claim 1, wherein the crosslinked hydroxypropyl starch phosphate has a degree of substitution of approximately 0.10 to 0.11.

8. The method as claimed in claim 1, wherein the dextrose equivalent is less than 3.

9. The method as claimed in claim 1, wherein the dextrose equivalent is less than 2.

10. The method as claimed in claim 1, wherein the reduced fat content is a reduction of about 50% by weight of the total fat content of said fresh milk product.

11. The method as claimed in claim 1 wherein the origin of the starch for the crosslinked hydroxypropyl starch phosphate and the white dextrin is:
waxy corn, for the crosslinked hydroxypropyl starch phosphate, and/or
pea, for the white dextrin.

12. The method as claimed in claim 1, wherein:
the crosslinked hydroxypropyl starch phosphate is incorporated into the fresh milk product in a content of between 1.5% and 5% by weight, and
the white dextrin is incorporated into the fresh milk product in a content of between 0.3% and 0.5% by weight.

13. The method as claimed in claim 1, wherein:
the crosslinked hydroxypropyl starch phosphate is incorporated into the fresh milk product in a content of approximately 3.7% by weight, and
the white dextrin is incorporated into the fresh milk product in a content about approximately 0.4% by weight.

14. The method as claimed in claim 1, wherein the fresh milk product is dessert creams.

* * * * *